United States Patent
Ma et al.

(10) Patent No.: US 9,534,178 B2
(45) Date of Patent: Jan. 3, 2017

(54) DISTILLATE TWO-PHASE HYDROGENATION REACTOR AND HYDROGENATION METHOD

(71) Applicant: PETROCHINA COMPANY LIMITED, Beijing (CN)

(72) Inventors: Shoutao Ma, Beijing (CN); Ran Tian, Beijing (CN); Zhihua Zhang, Beijing (CN); Gang Wang, Beijing (CN); Famin Sun, Beijing (CN); Ruiqin Zhang, Beijing (CN); Chunmei Yu, Beijing (CN); Shengbo Sun, Beijing (CN); Xiufang Feng, Beijing (CN); Fengxuan Li, Beijing (CN); Jinling Zhu, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 0 days.

(21) Appl. No.: 14/764,485

(22) PCT Filed: Aug. 1, 2013

(86) PCT No.: PCT/CN2013/000904
§ 371 (c)(1),
(2) Date: Jul. 29, 2015

(87) PCT Pub. No.: WO2014/117310
PCT Pub. Date: Aug. 7, 2014

(65) Prior Publication Data
US 2015/0361357 A1 Dec. 17, 2015

(30) Foreign Application Priority Data
Jan. 30, 2013 (CN) .......................... 2013 1 0035980

(51) Int. Cl.
*B01J 8/00* (2006.01)
*B01J 8/02* (2006.01)
(Continued)

(52) U.S. Cl.
CPC .............. *C10G 65/08* (2013.01); *B01J 8/0453* (2013.01); *B01J 8/0492* (2013.01); *C10G 45/20* (2013.01);
(Continued)

(58) Field of Classification Search
CPC ................... B01J 8/00; B01J 8/02; B01J 8/04; B01J 8/0446; B01J 8/0449; B01J 8/0453; B01J 8/0492; B01J 2208/00796; B01J 2208/00823; B01J 2208/00831; B01J 2208/00849; B01J 2208/00938; C10L 1/00; C10L 1/04; C10L 1/08; C10L 2270/00; C10L 2270/02; C10L 2270/026; C10L 2290/54; C10L 2290/545; C10G 45/00; C10G 45/02; C10G 45/14; C10G 45/20; C10G 49/00; C10G 65/00; C10G 65/02; C10G 65/04; C10G 65/08; C10G 65/10; C10G 2400/00; C10G 2400/02; C10G 2400/04; C10G 2400/08; C10G 2400/10
See application file for complete search history.

(56) References Cited

U.S. PATENT DOCUMENTS

| 4,456,461 A | * | 6/1984 | Perez | ...................... C07C 7/005 62/622 |
| 5,093,535 A | * | 3/1992 | Harrison | ..................... B01J 8/02 554/141 |

(Continued)

FOREIGN PATENT DOCUMENTS

| CN | 86108622 | 6/1988 |
| CN | 93101935.4 | 8/1993 |

(Continued)

OTHER PUBLICATIONS

Written Opinion issued on Nov. 13, 2015 for counterpart Singapore Patent Application No. 11201505319S.
(Continued)

*Primary Examiner* — Natasha Young
(74) *Attorney, Agent, or Firm* — Michael F. Fedrick; Loza & Loza, LLP

(57) ABSTRACT

A hydrogenation method and distillate two-phase hydrogenation reactor in which the size of an upper space of the reactor is greater than that of a lower catalyst bed part. The reactor comprises 2 to 4 catalyst beds. An inner component for gas replenishment and for stripping a liquid-phase stream containing impurities is arranged between at least one adjacent catalyst bed and comprises a separator plate and exhaust pipes. The separator plate is provided with multiple
(Continued)

downcomer through holes. The separator plate is connected with a plurality of exhaust pipes. The exhaust pipes are vertically arranged above the separator plate. The top parts of the exhaust pipes are in contact with the lower part of the upper catalyst bed.

17 Claims, 3 Drawing Sheets

(51) Int. Cl.
| | |
|---|---|
| *B01J 8/04* | (2006.01) |
| *C10G 45/00* | (2006.01) |
| *C10G 45/02* | (2006.01) |
| *C10G 65/00* | (2006.01) |
| *C10G 65/02* | (2006.01) |
| *C10G 65/04* | (2006.01) |
| *C10G 65/08* | (2006.01) |
| *C10L 1/04* | (2006.01) |
| *C10G 45/20* | (2006.01) |
| *C10L 1/08* | (2006.01) |
| *C10G 49/00* | (2006.01) |
| *C10L 1/00* | (2006.01) |

(52) U.S. Cl.
CPC ............... *C10G 65/04* (2013.01); *C10L 1/04* (2013.01); *C10L 1/08* (2013.01); *B01J 2208/00849* (2013.01); *B01J 2208/00938* (2013.01); *C10G 2400/02* (2013.01); *C10G 2400/04* (2013.01); *C10G 2400/08* (2013.01); *C10G 2400/10* (2013.01); *C10L 2270/026* (2013.01); *C10L 2290/545* (2013.01)

(56) References Cited

U.S. PATENT DOCUMENTS

| | | | |
|---|---|---|---|
| 6,213,835 | B1 | 4/2001 | Wolthoff |
| 6,407,300 | B2 * | 6/2002 | Maraschino ........... B01D 3/009 203/DIG. 6 |
| 6,428,686 | B1 | 8/2002 | Ackerson et al. |
| 7,156,977 | B2 | 1/2007 | Wrisberg et al. |
| 2002/0156214 | A1 | 10/2002 | Laurent |
| 2006/0144756 | A1 | 7/2006 | Ackerson et al. |

FOREIGN PATENT DOCUMENTS

| | | | |
|---|---|---|---|
| CN | 94102955.7 | | 9/1997 |
| CN | 96120125.8 | | 2/2001 |
| CN | 96109792.2 | | 7/2001 |
| CN | 101338219 | | 1/2009 |
| CN | 102039104 | | 5/2011 |
| CN | 102039105 | | 5/2011 |
| CN | 102634367 | A * | 8/2012 |
| CN | 102732299 | A * | 10/2012 |
| CN | 200680018017.3 | | 3/2013 |

OTHER PUBLICATIONS

International Written Opinion, International Patent Application No. PCT/CN2013/000904, Nov. 2, 2015.
International Search Report, International Patent Application No. PCT/CN2013/000904, Aug. 7, 2014.

* cited by examiner

DISTILLATE TWO-PHASE HYDROGENATION REACTOR AND HYDROGENATION METHOD

This application is the U.S. national stage of International Patent Application No. PCT/CN2013/000904, now WO 2014/117310, filed on Aug. 1, 2013 and entitled DISTILLATE TWO-PHASE HYDROGENATION REACTOR AND HYDROGENATION METHOD, which claims the benefit of priority under 35 U.S.C. §119 from Chinese Patent Application No. 201310035980.4, filed Jan. 30, 2013. The disclosures of the foregoing applications are incorporated herein by reference in their entirety.

FIELD OF THE INVENTION

The present invention relates to a distillate two-phase hydrogenation reactor and a hydrogenation method, specifically to a liquid phase reactor with product circulation, especially a reactor with circulating a product containing dissolved hydrogen gas in hydrocarbon liquid-phase material and liquid-phase hydrogenation, and a liquid-phase hydrogenation method using the reactor.

BACKGROUND OF ART

With increasingly reinforced environmental consciousness, many countries have limited sulfur content of diesel fuel to a quite low level (10 to 15 μg/g), to reduce the emission of harmful gases, and improve air quality by means of environmental legislation. The sulfur content of diesel fuel was decreased to 15 μg/g in 2006 in USA. The sulfur content of diesel fuel was decreased to 10 μg/g in January, 2003 in Germany. The sulfur content of diesel fuel was decreased to 10 μg/g in 2008 in other countries of European Union (EU) and Japan. The national standard on the urban automotive diesel fuel of China, GB 19147-2009 was formulated according to the Europe's category III standard, which requires the sulfur content to be less than 350 μg/g. In the discharging index of the fifth stage for the automotive gasoline and diesel oil, issued by the State Ministry of Environmental Protection of China, it is required that the sulfur content in the diesel oil should be less than 10 μg/g.

The requirement for the diesel oil in the international market has been increasing constantly. However, the supply amount of high-grade feedstock oil has been decreasing. How to utilize the low-grade feedstock oil to manufacture diesel with ultralow sulfur content to meet the increasing demand has been a big challenge that the refineries have to face. To meet the challenge, on one hand, it needs to resolve the key technological difficulties, and newly construct hydrogenation apparatuses to conduct deep hydrodesulfurization for diesel; on the other hand, it needs to reduce risks and repeated investments in order to guarantee economic benefits. In the traditional hydrogenation process using a fixed bed, it is necessary to transfer hydrogen gas from gas phase to liquid phase, then the reaction between the dissolved hydrogen and sulfur compound occurs at an active centre of catalysts, thereby achieving the desulfuration purpose. During the process, the required volume of hydrogen gas is much greater than that consumed in the hydrogenation reaction. This is because, on one hand, the hydrogenation reaction is a strong exothermic reaction, which, for controlling the reaction temperature, needs a large amount of hydrogen gas and feedstock oil to pass through catalyst beds to bring away reaction heat; on the other hand, in the reaction related to three phases of gas, liquid and solid, maintaining a high hydrogen partial pressure is helpful for the hydrogenation reaction, inhibiting the production of coke and prolonging catalyst life. In addition, the hydrogen not reacted in the reaction may be retransferred to the reactor for reaction after the pressure thereof is increased by passing through a circulating hydrogen compressor. As key equipment for the hydrogenation process, the circulating hydrogen compressor has a high cost in investment and operation. In order to eliminate the circulating hydrogen and the circulating hydrogen compressor so as to reduce the investment cost of the apparatus, a liquid-phase hydrogenation technology was proposed. In the liquid-phase circulation hydrogenation process, the hydrogen gas is premixed with the feedstock oil, so that the hydrogen gas is dissolved in the feedstock oil, then the mixture is introduced into the reactor for reaction. The hydrogen gas needed during the reaction are entirely from the dissolved hydrogen without additional supplement of cool hydrogen. The liquid-phase circulation hydrogenation process possesses advantages of small reactor, low investment cost, easy control of the reaction temperature and the like. However, this liquid-phase circulation hydrogenation process also has one problem, that is, in order to meet the hydrogen gas volume needed in the hydrogenation reaction, it is necessary to use a large amount of circulation oil or additionally add a solvent to dissolve the hydrogen gas, which results in the reduction of the hydrogenation efficiency.

In the conventional fixed-bed hydrogenation process, in order to remove impurities such as sulfur, nitrogen, oxygen, and metal in the raw material or reduce the size of the feedstock oil molecules, it is necessary to carry out a catalytic hydrogenation reaction. In order to control the reaction temperature of a catalyst bed and prevent the catalyst from deactivation by carbon deposition, generally a high hydrogen-oil volume ratio is used, which certainly causes a large amount of surplus hydrogen gas after completion of the hydrogenation reaction. The surplus hydrogen gas is usually pressurized by a circulating hydrogen compressor and then mixed with new hydrogen to be reused as hydrogen feed for reaction. This process can be also defined as a gas-phase circulating, fixed-bed hydrogenation process. For this process, the investment of the circulating hydrogen compressor occupies a relatively high proportion of the whole hydrogenation device cost. The heat exchange system for hydrogen gas has a high energy consumption, so if the hydrogen gas flow in the process of hydrogenation can be reduced and the hydrogen gas circulating system and the circulating hydrogen compressor can be omitted, then the investment of enterprises can be saved, and the cost is reduced for clean fuel production.

Generally, for raw materials containing simple sulfide, the reaction rate of its hydrodesulfurization in a fixed bed hydrogenation reactor is not only related with the concentration of organic sulfide, but also affected by the factors such as wetting situation of the catalyst, concentrations of organic nitride and $H_2S$ in the reactor system, and the like. The wetting factor of the catalyst is a measurement of the infiltration degree of the catalyst surface by a liquid reactant under the condition of hydrogenation reaction. The higher is the infiltration degree of the catalyst, the higher the wetting factor of the catalyst will be, that is to say, the higher the effective availability of the catalyst will be. Under the condition that the factors including the catalyst and the like have been defined, the main factor affecting the wetting factor of the catalyst is the flow rate of the liquid in the reactor and the ratio of the flow rate of the gas to that of the liquid. It is generally considered that the increase in the flow rate of the liquid enhances the wetting effect of the catalyst, while the conventional hydrogenation process mostly utilizes a high ratio of hydrogen to oil much more than the need of the reaction, thereby decreasing the wetting effect of the catalyst, and having an adverse influence on the wetting factors. In addition, the investment of the section of hydrogen circulation during petroleum refining occupies a large proportion of the cost of the whole process.

Organic nitride is poison for the hydrogenation catalyst, which has an obvious inhibition effect on the reaction of hydrodenitrification, hydrodesulfurization, and hydrodearomatization. This inhibition effect is mainly caused by the very strong adsorption energy of some nitrides and most of the intermediate reaction product of nitrides to the active centre for hydrogenation reaction of the catalyst, which inhibits occurrence of the other hydrogenation reaction from a viewpoint of competitive adsorption. However, the impurity content of the raw material will be decreased greatly by circulating the hydrogenated product, which helps to exert the performance of the catalyst.

United State patent US20060144756A1 discloses a control system method and apparatus for two phase hydroprocessing. In a continuous liquid phase hydroprocessing, the circulating hydrogen is eliminated, and all the hydrogen needed by the hydrogenation reaction comes from the hydrogen dissolved in the liquid phase without the need of additional hydrogen gas. However, it needs to utilize a solvent or diluent with a high hydrogen solubility to dissolve hydrogen, which influences the subsequent hydrogenation efficiency.

U.S. Pat. No. 6,213,835, U.S. Pat. No. 6,428,686, and CN200680018017.3 discloses a hydrogenation process with dissolving hydrogen in advance, which controls the volume of liquid or the air pressure in the reactor by controlling the hydrogen gas amount contained in liquid feed. But these patents have not totally resolved the problem of removing the detrimental impurity such as $H_2S$ and $NH_3$ produced in the hydrorefining reaction process, which results in a continuous accumulation of these impurities in the reactor, thereby greatly reducing the reaction efficiency, and failing to effectively handle raw material with high sulphur and nitrogen content. The above patents do not disclose the specific structure of the reactor, either.

The Chinese patent CN86108622 discloses a hydrorefining process for oil produced by cracking, wherein the volume ratio of hydrogen to oil is 200:1 to 1000:1; the Chinese patent CN93101935.4 discloses a one-stage hydrocracking method for poor-quality feedstock oil, wherein the volume ratio of hydrogen to oil is 1300:1 to 1500:1; the Chinese patent CN94102955.7 discloses a hydrorefining method for DCC gasoline, wherein the volume ratio of hydrogen to oil is 150:1 to 500:1; the Chinese patent CN96109792.2 discloses a method for producing high quality Vaseline by serial hydrogenation process, wherein the volume ratio of hydrogen to oil is 300:1 to 1400:1; and the Chinese patent CN96120125.8 discloses a method for manufacturing white oil by means of direct hydrogenation from naphthenic base straight-run, wherein the volume ratio of hydrogen to oil is 500:1 to 1500:1.

These patents are characterized in a high volume ratio of hydrogen to oil, thus the hydrogen gas circulating step and the circulating hydrogen compressor are necessary.

SUMMARY OF THE INVENTION

The purpose of the present invention is to provide a distillate two-phase hydrogenation reactor, which adopts a suitable structure, effectively supplements the hydrogen gas in the liquid-phase raw material, while removing hydrogen sulfide and ammonia entering the catalyst bed, avoids the adverse effect of harmful impurities on the catalytic reaction, and improves the hydrogenation efficiency and raw material applicability, and a hydrogenation method.

The reactor according to the present invention includes a reactor cylinder, catalyst beds, a reactor inlet and a reactor outlet, and is characterized in that the size of an upper space of the hydrogenation reactor is slightly greater than that of a lower catalyst bed part, and the reactor includes at least two catalyst beds, wherein an inner component for gas replenishment and for stripping a liquid-phase stream containing impurities is arranged between at least one adjacent catalyst bed, the inner component comprises a gas-liquid contact component and a stripping component, the gas-liquid contact component and the stripping component are arranged together, the inner component comprises a separator plate and exhaust pipes, the separator plate is provided with downcomer through holes; the separator plate is connected with exhaust pipes, the exhaust pipes are arranged above the separator plate, and the top parts of the exhaust pipes are in contact with the lower part of the upper catalyst bed.

In the hydrogenation reactor according to the present invention, the size of the upper space of the reactor is slightly greater than that of the lower catalyst bed part, which avoids the flooding at the upper part of the reactor and the blocking of gas lines at the top.

In the hydrogenation reactor according to the present invention, the inner component comprises a separator plate and exhaust pipes, wherein the separator plate is provided with downcomer through holes, and the gas phase and liquid phase comes in contact with each other via downcomer through holes.

In the internal component according to the present invention, there are arranged several downcomer through holes and exhaust pipes, and the exhaust pipes are arranged above the separator plate.

In the hydrogenation reactor according to the present invention, an exhaust system is arranged at the top of the reactor, the reactor is provided with a pressure and liquid level monitoring system, the exhaust system is interlocked with the pressure and liquid level monitoring system, and the pressure and liquid level of the reactor are controlled by controlling the amount of the gas and liquid discharged from the reactor.

In the hydrogenation reactor according to the present invention, the aforementioned inner component for gas replenishment and for stripping a liquid-phase stream containing impurities can also be arranged at the top and/or the bottom of the reactor.

The key of the hydrogenation reactor according to the present invention is the use of a stripping component having a suitable structure (the other structures of the reactor can adopt the conventional structure in the art), so that the gas with impurities after reaction no longer passes through the lower catalyst bed but is directly discharged out of the reactor, and reduces the adverse effect of the impurities after reaction on the next step of the reaction.

The hydrogenation reactor according to the present invention is a liquid-phase hydrogenation reactor for hydrocarbon raw materials, wherein a portion of the liquid-phase product after reaction is circulated, and the catalyst bed uses hydrocarbon hydrogenation catalyst.

The liquid-phase hydrogenation method according to the present invention uses the reactor of the present invention, and the process includes: circulating a portion of a hydrogenated liquid-phase product, and mixing it with fresh raw material into a liquid-phase material, forming, after dissolving hydrogen, a saturated liquid-phase stream, which is introduced into the reactor from the upper part, carrying out a hydrogenation reaction on a hydrogenation catalyst bed at the upper part of the reactor, passing an effluent after the reaction through the internal component to be mixed with hydrogen gas, to supplement the amount of hydrogen gas dissolved in the liquid-phase material, introducing the liquid-phase material supplemented with dissolved hydrogen into the next hydrogenation catalyst bed; introducing gas-phase hydrogen into the catalyst bed through the exhaust pipes of the stripping component, forming a gas-liquid countercurrent on the catalyst bed, so that the concentration of hydrogen gas on the catalyst bed is increased, the reaction efficiency is improved, and the hydrogen gas strips hydrogen sulfide and ammonia produced impurities in the reaction.

In the above-mentioned liquid-phase hydrogenation method according to the present invention, the volume ratio of the circulated liquid-phase product to the fresh raw material is 0.1:1 to 10:1, the number of the arranged catalyst beds is 2 to 4, the amount of hydrogen gas supplemented among the catalyst beds is 0.5:1 to 10:1 in terms of hydrogen-oil volume ratio.

In the above-mentioned liquid-phase hydrogenation method according to the present invention, the reaction condition for passing the liquid-phase material through the catalyst bed can be specifically determined by persons skilled in the art according to the nature of raw materials, and product quality requirements. Generally, the reaction temperature is 130 to 450° C., the reaction pressure is 1 to 20 MPa, and the liquid hourly space velocity (LHSV) is 0.5 to 15 $h^{-1}$.

Figure 1:
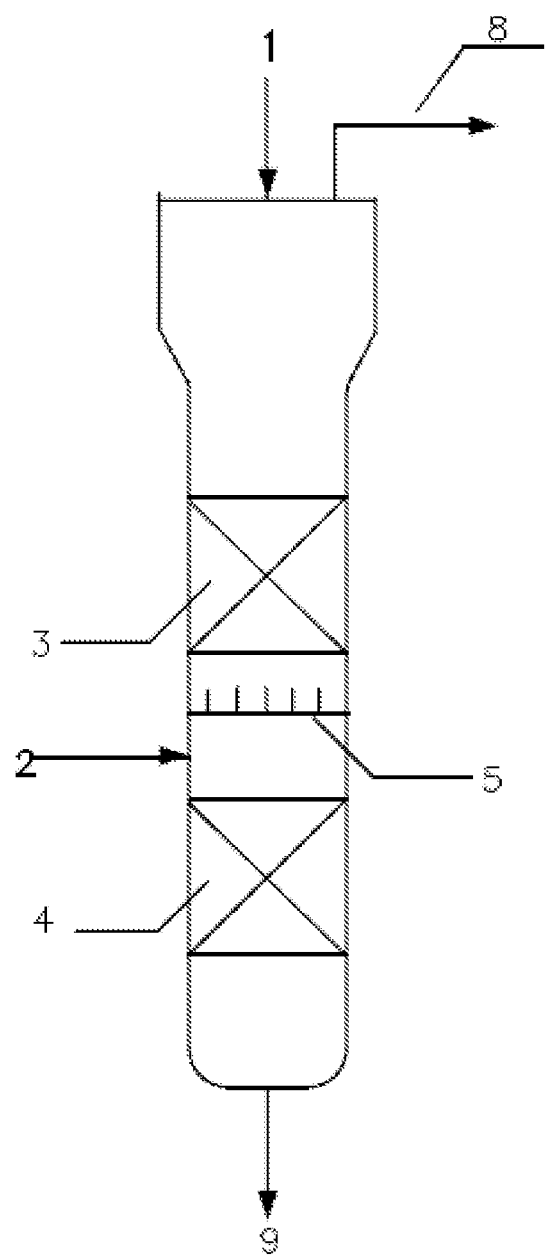
FIG. 1 is a schematic diagram of the distillate two-phase hydrogenation reactor of the present invention.

In the drawing: 1—reactor inlet, 2—hydrogen gas inlet, 3—first catalyst bed, 4—second catalyst bed, 5—gas-liquid contact and stripping component, 6—exhaust pipe, 7—downcomer through hole, 8—exhaust system of the reactor, 9—reactor outlet.

DETAILED DESCRIPTION OF THE EMBODIMENTS

The structure of the reactor and the operation method of the hydrogenation process of the present invention will be further explained below by referring to the drawings.

Figure 2:
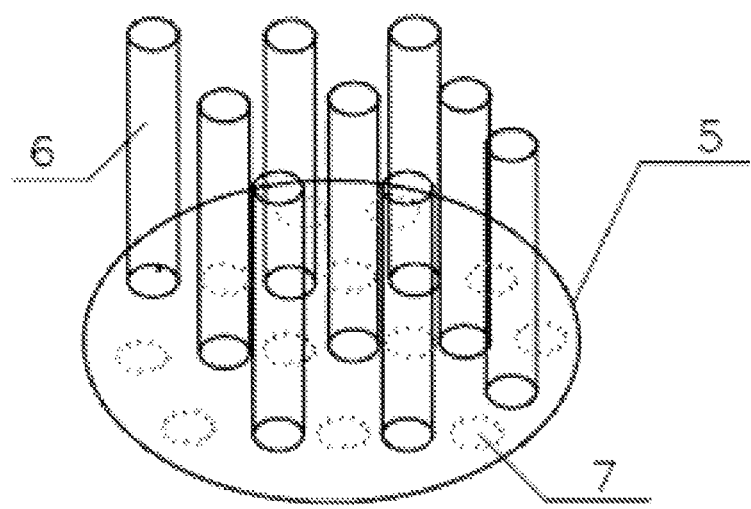
FIG. 2 is a schematic diagram of the internal component of the distillate two-phase hydrogenation reactor of the present invention.
Figure 3:
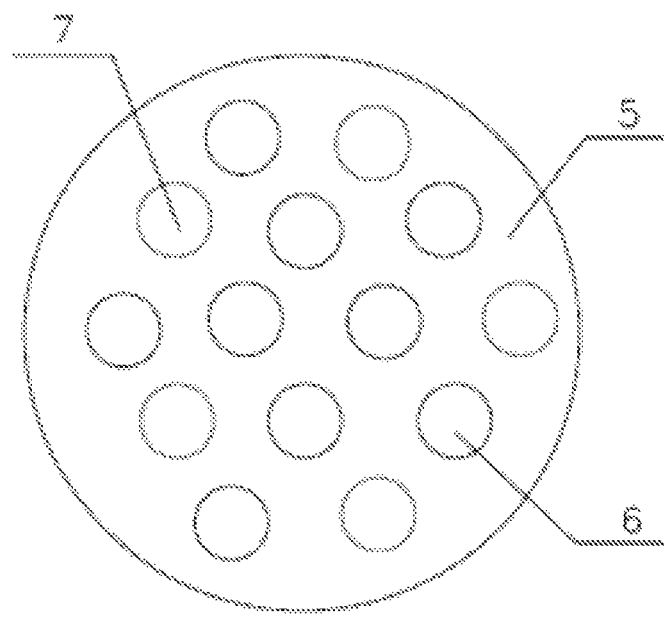
FIG. 3 is a top view of the internal component of the distillate two-phase hydrogenation reactor of the present invention.

As shown in FIG. 1 and FIG. 2, a specific structure of the reactor of the present invention includes a reactor inlet 1, a hydrogen gas inlet 2, and a reactor outlet 9, wherein the size of the upper space of the reactor is slightly greater than that of the lower catalyst bed part, and two catalyst beds (a first catalyst bed 3 and a second catalyst bed 4) are used. An inner component for gas replenishment and for stripping a liquid-phase stream containing impurities is arranged between the two catalyst beds. The inner component comprises a separator plate 5 and exhaust pipes 6. The separator plate is provided with downcomer through holes 7. The separator plate 5 is connected with exhaust pipes 6. The exhaust pipes 6 are arranged above the separator plate 5. The top parts of the exhaust pipes 6 are in contact with the lower part of the upper catalyst bed.

A portion of a hydrogenated liquid-phase product is circulated, and mixed with fresh raw material into a liquid-phase material, after dissolving hydrogen, a saturated liquid-phase stream is formed, which is introduced into the reactor from the upper part, a hydrogenation reaction is carried out on the first hydrogenation catalyst bed, an effluent after the reaction passes through the internal component to be mixed with hydrogen gas, to supplement the amount of hydrogen gas dissolved in the liquid-phase material, the liquid-phase material supplemented with dissolved hydrogen is introduced into the second hydrogenation catalyst bed; the gas-phase hydrogen is introduced into the first catalyst bed through the exhaust pipes of the stripping component, a gas-liquid countercurrent is formed on the catalyst bed, meanwhile the hydrogen gas strips the hydrogen sulfide and ammonia impurities produced in the reaction. The reaction effluent from the second catalyst bed is discharged from the reactor, and then a portion thereof is circulated and another portion thereof is introduced into the product tank.

The present invention will be further explained by the following examples.

The catalyst used in the experiment is an industrially used hydrogenation and hydrocracking catalyst, including PHF-101 diesel hydrodesulfurization catalyst, PHT-01 heavy oil hydrogenation pretreatment catalyst, PHC-03 hydrocracking catalyst, which are developed and produced by Research Institute of Petroleum Processing of Petrochina. The physical and chemical property indexes thereof are shown in Table 1.

Example 1

The mixed diesel oil was sufficiently mixed with hydrogen gas for dissolving hydrogen, and then introduced into the hydrogenation reactor under the reaction conditions of the hydrogen partial pressure at 6.0 MPa, the reaction temperature at 311° C., and the amount of hydrogen gas supplemented among the catalyst beds being 1:1 in terms of hydrogen-oil volume ratio. A portion of the liquid-phase product passed through the circulation pump as the circulated oil, and was mixed with fresh raw material for dissolving hydrogen, and then introduced into the reactor, and another portion of the liquid-phase product was introduced into the product tank in the form of product. The properties of the feedstock oil and the properties of the products are listed in Table 2.

As seen from Table 2, the sulfur and nitrogen content in the diesel oil can be reduced remarkably by the use of this technology.

Example 2

The heavy gatch feedstock was sufficiently mixed with hydrogen gas for dissolving hydrogen, and then introduced into the hydrogenation reactor under the reaction conditions of the hydrogen partial pressure at 12.0 MPa, the reaction temperature at 370° C., and the amount of hydrogen gas supplemented among the catalyst beds being 3:1 in terms of hydrogen-oil volume ratio. A portion of the liquid-phase product passed through the circulation pump as the circulated oil, and was mixed with fresh raw material for dissolving hydrogen, and then introduced into the reactor, and another portion of the liquid-phase product was introduced into the product tank in the form of product. The properties of the feedstock oil and the properties of the products are listed in Table 3.

As seen from Table 3, when the mixed gatch containing 10 wt % coker gatch is used as the raw material, the content of sulfur and nitrogen impurities in the heavy gatch can be reduced remarkably by the use of this technology.

Example 3

The gatch feedstock processed by Example 2 was sufficiently mixed with hydrogen gas for dissolving hydrogen, and then introduced into the hydrogenation reactor under the reaction conditions of the hydrogen partial pressure at 12.0 MPa, the reaction temperature at 385° C., and the amount of hydrogen gas supplemented among the catalyst beds being 7:1 in terms of hydrogen-oil volume ratio. A portion of the liquid-phase product passed through the circulation pump as the circulated oil, and was mixed with fresh raw material for dissolving hydrogen, and then introduced into the reactor, and another portion of the liquid-phase product was introduced into the product tank in the form of product, and then cut according to the true boiling point. The properties of the feedstock oil are listed in Table 4, and the product distribution and properties are listed in Table 5.

As seen from Table 5, when the mixed gatch containing 10 wt % coker gatch is used as the raw material, under the process conditions of controlling the tail oil yield (>370° C.) at about 20 wt %, high-quality jet fuel and clean diesel oil can be produced by the use of this technology.

Comparative Example 1

As compared with Example 1, the mixed diesel oil having the same properties was processed, but there is no internal component between the two catalyst beds in the reactor, and all of the hydrogen gas were introduced into the reactor from the reactor inlet. Other process conditions are the same as those in Example 1, and the properties of the refined diesel oil are shown in Table 6. It can be seen from Table 6 that the reaction temperature in the reactor of the present invention is 15° C. lower than that of the conventional reactor, but the product properties are better.

TABLE 1

Physical and chemical property indexes of catalysts

| | Catalyst No. | | |
|---|---|---|---|
| | PHF-101 | PHT-01 | PHC-03 |
| Metal composition | | | |
| $WO_3$ | 25.1 | — | 25.1 |
| $MoO_3$ | — | 20 to 30 | — |
| NiO | 3.2 | 3 to 10 | 5.3 |
| Pore volume, mL/g | ≮0.37 | ≮0.33 | ≮0.35 |
| Specific surface area, m2/g | ≮150 | ≮160 | ≮190 |
| Shape | trefoil | trefoil | cylindrical |

TABLE 2

Properties of the feedstock oil and the experimental result of Example 1

| Item | Mixed diesel oil | Mixed diesel oil (160 to 230° C.) | Mixed diesel oil (>230° C.) | Generated oil by refining (160 to 230° C.) | Generated oil by refining (>230° C.) |
|---|---|---|---|---|---|
| Density (20° C.), g/cm³ | 0.8350 | 0.8110 | 0.8731 | 0.8122 | 0.8614 |
| Sulphur content, μg/g | 1020.0 | 541.8 | 1602.1 | 2.3 | 7.9 |
| Nitrogen content, μg/g | 881.8 | 267.7 | 1330.6 | 8.9 | 9.8 |

TABLE 3

Properties of the feedstock oil and the experimental result of Example 2

| Item | Heavy gatch | Generated oil |
|---|---|---|
| Density (20° C.), g/cm3 | 0.8559 | 0.8502 |
| Sulphur content, μg/g | 780.0 | 8.1 |
| Nitrogen content, μg/g | 697.0 | 5.2 |

TABLE 4

Properties of the feedstock oil of Example 3

| Items | Analytical result |
|---|---|
| Density (20° C.), g/cm3 | 0.8559 |
| Boiling range, ° C. | |
| IBP/10% | 249/333 |
| 30%/50% | 376/405 |
| 70%/90% | 438/478 |
| 95%/EBP | 492/519 |
| Sulphur content, μg/g | 780.0 |
| Nitrogen content, μg/g | 697.0 |
| BMCI value | 22.2 |

TABLE 5

Experiment result of Example 3

| Item | Product distribution and properties |
|---|---|
| $C_5^+$ liquid yield, wt. % | 98.5 |
| Product yield and quality | |
| 65 to 165° C. heavy naphtha yield, wt. % | 15.69 |
| Sulphur content, μg/g | <0.5 |
| Nitrogen content, μg/g | <0.5 |
| 165 to 260° C. jet fuel yield, wt. % | 23.83 |
| Freezing point, ° C. | −51 |
| Smoke point, ° C. | 30 |
| 260 to 370° C. diesel oil yield, wt. % | 35.42 |
| Cetane index | 83.2 |
| Condensation point, ° C. | −2 |
| 165 to 370° C. diesel oild yield, wt. % | 59.25 |
| >370° C. tail oil yield, wt. % | 19.80 |
| BMCI value | 7.6 |

TABLE 6

Properties of the feedstock oil and the experimental result of Comparative Example 1

| Item | | Comparative Example 1 | | Example 1 |
|---|---|---|---|---|
| Reaction temperature, ° C. | | 326 | | 311 |
| Hydrogen partial pressure, MPa | | 6.0 | | 6.0 |
| Properties of oil product | Mixed diesel oil | Mixed diesel oil (>230° C.) | Generated oil of the reactor without internal component (>230° C.) | Generated oil of the reactor of the present invention (>230° C.) |
| Density, (20° C.), g/cm3 | 0.8350 | 0.8731 | 0.8501 | 0.8614 |
| Sulphur content, μg/g | 1020.0 | 1602.1 | 40.0 | 7.9 |
| Nitrogen content, μg/g | 881.8 | 1330.6 | 48.0 | 9.8 |

INDUSTRIAL APPLICABILITY

In the hydrogenation method with product circulation according to the present invention, two or more reactors may be used in series (the effluent from one reactor is introduced into the next reactor) or in parallel (the material is introduced into different reactors, respectively) as needed.

In the above-mentioned liquid-phase hydrogenation method, it is possible to use a suitable hydrogenation catalyst such as hydrorefining catalyst, hydro-upgrading catalyst, hydrogenation catalyst, hydrocracking catalyst according to the requirement of the reaction, to achieve different hydrogenation purposes. Various catalysts may be selected from commercial catalysts, or be prepared according to the prior art.

By the use of the abovementioned reactor, the liquid-phase hydrogenation method of the present invention can effectively replenish hydrogen gas in a liquid-phase raw material, form a gas-liquid countercurrent on the catalyst beds, increase the concentration of hydrogen gas, remove hydrogen sulfide and ammonia produced by the reaction, reduce inhibitory effects of $H_2S$ and $NH_3$ on a subsequent hydrogenation reaction, enhance hydrogenation efficiency, and improve raw material applicability. The method does not need circulating hydrogen or circulating hydrogen compressor, which can reduce the equipment investment and the operation cost.

The present invention is mainly used for the deep desulfurization, denitrification and dearomatization of inferior diesel oil components, the production of clean diesel oil, and the hydrorefining of naphtha, jet fuel, lubricating oil, paraffin and the like to produce high-quality oil products, and the process of manufacturing high-quality clean jet fuel and diesel oil by means of mild hydrocracking of gatch feedstock.

During the hydrogenation reaction in the present invention, the amount of the used hydrogen gas is the stoichiometric hydrogen consumption amount plus the amount of dissolved hydrogen amount slightly more than that of the system. The section for reaction is not provided with a hydrogen circulating system, the hydrogen gas needed for the hydrogenation reaction of the fresh raw material is provided by the dissolved hydrogen entrained into the reaction system from the circulation of a large amount of liquid-phase product and the dissolved hydrogen supplemented by the hydrogen gas. Due to the reuse of the hydrogenated product, the activity stability of the catalyst can be maintained. This method is advantageous in that the influence of the wetting factor of the catalyst and the influence of $H_2S$ and $NH_3$ in the circulating hydrogen can be eliminated; due to a high specific heat capacity of the circulated oil, it is possible to reduce the temperature rise in the reactor and improve the utilization efficiency of the catalyst.

What is claimed is:
1. A distillate two-phase hydrogenation reactor, wherein the size of an upper space of the reactor is greater than that of a lower catalyst bed part, and wherein the reactor comprises at least 2 catalyst beds.
2. The distillate two-phase hydrogenation reactor according to claim 1, wherein the reactor comprises 2 to 4 catalyst beds.
3. The distillate two-phase hydrogenation reactor according to claim 1, wherein an inner component for gas replenishment and for stripping a liquid-phase stream containing impurities is arranged between at least one adjacent catalyst bed.
4. The distillate two-phase hydrogenation reactor according to claim 3, wherein the inner component comprises a gas-liquid contact component and a stripping component.
5. The distillate two-phase hydrogenation reactor according to claim 4, wherein the gas-liquid contact component and the stripping component are arranged together.

6. The distillate two-phase hydrogenation reactor according to claim 3, wherein the inner component comprises a separator plate and exhaust pipes.

7. The distillate two-phase hydrogenation reactor according to claim 6, wherein the separator plate is provided with multiple downcomer through holes.

8. The distillate two-phase hydrogenation reactor according to claim 6, wherein the separator plate is connected with the exhaust pipes.

9. The distillate two-phase hydrogenation reactor according to claim 6, wherein the exhaust pipes are vertically arranged above the separator plate.

10. The distillate two-phase hydrogenation reactor according to claim 6, wherein the top parts of the exhaust pipes are in contact with the lower part of the upper catalyst bed.

11. A liquid-phase hydrogenation method for removing impurities from a hydrocarbon raw material, characterized in using the reactor according to claim 1.

12. The liquid-phase hydrogenation method according to claim 11, comprising:
   circulating a portion of a hydrogenated liquid-phase product, and mixing it with fresh raw material into a liquid-phase material, forming, after dissolving hydrogen, a saturated liquid-phase stream, which is introduced into the reactor from the upper part,
   carrying out a hydrogenation reaction on a hydrogenation catalyst bed at the upper part of the reactor,
   passing an effluent after the reaction through the internal component to be mixed with hydrogen gas, to supplement the amount of hydrogen gas dissolved in the liquid-phase material,
   introducing the liquid-phase material supplemented with dissolved hydrogen into the next hydrogenation catalyst bed,
   introducing gas-phase hydrogen into the catalyst bed through the exhaust pipes of the stripping component, and
   forming a gas-liquid countercurrent on the catalyst bed, so that the concentration of hydrogen gas on the catalyst bed is increased, wherein the hydrogen gas strips hydrogen sulfide and ammonia impurities produced in the reaction.

13. The liquid-phase hydrogenation method according to claim 12, wherein the volume ratio of the circulated liquid-phase product to the fresh raw material is 0.1:1 to 10:1.

14. The liquid-phase hydrogenation method according to claim 12, wherein the amount of hydrogen gas supplemented among the catalyst beds is 0.5:1 to 10:1 in terms of hydrogen-oil volume ratio.

15. The liquid-phase hydrogenation method according to claim 12, wherein the reaction temperature at which the liquid-phase material is passed through the catalyst bed is 130 to 450° C.

16. The liquid-phase hydrogenation method according to claim 12, wherein the reaction pressure at which the liquid-phase material is passed through the catalyst bed is 1 to 20 MPa.

17. The liquid-phase hydrogenation method according to claim 12, wherein and the liquid hourly space velocity (LHSV) at which the liquid-phase material is passed through the catalyst bed is 0.5 to 15 $h^{-1}$.

* * * * *